J. STERN.

GAME APPARATUS.

APPLICATION FILED JUNE 4, 1908.

Reissued Oct. 12, 1909.

13,025.

2 SHEETS—SHEET 1.

WITNESSES:

G. V. Rasmussen

Elmer Shilyonny

INVENTOR

JULIUS STERN

BY

Briesen & Knauth

ATTORNEYS

ANDREW B. GRAHAM CO., PHOTO-LITHOGRAPHERS, WASHINGTON, D. C.

J. STERN.

GAME APPARATUS.

APPLICATION FILED JUNE 4, 1908.

Reissued Oct. 12, 1909.

13,025.

2 SHEETS—SHEET 2.

WITNESSES:

G. V. Rasmussen

Emil Schilgowny

INVENTOR

JULIUS STERN

BY

Briesen & Knauth

ATTORNEYS

ANDREW B. GRAHAM CO., PHOTO-LITHOGRAPHERS, WASHINGTON, D. C.

UNITED STATES PATENT OFFICE.

JULIUS STERN, OF NEW YORK, N. Y.

GAME APPARATUS.

13,025. Specification of Reissued Letters Patent. Reissued Oct. 12, 1909.

Original No. 858,918, dated July 2, 1907, Serial No. 353,412. Application for reissue filed June 4, 1908. Serial No. 436,725.

*To all whom it may concern:*

Be it known that I, JULIUS STERN, a citizen of the United States, and a resident of the city of New York, borough of Brooklyn, in the county of Kings and State of New York, have invented a new and Improved Game Apparatus, of which the following is a full, clear, and exact specification.

This invention has for its object to provide a game designed to be played on a table by means of a ball adapted to travel between pins, and come in contact with one or more counters, thereby causing the counters to register with each operation of the ball. Such objects I accomplish by the means illustrated in the accompanying drawings, in which drawings like characters of reference indicate like parts throughout the views, and in which—

Figure 1:
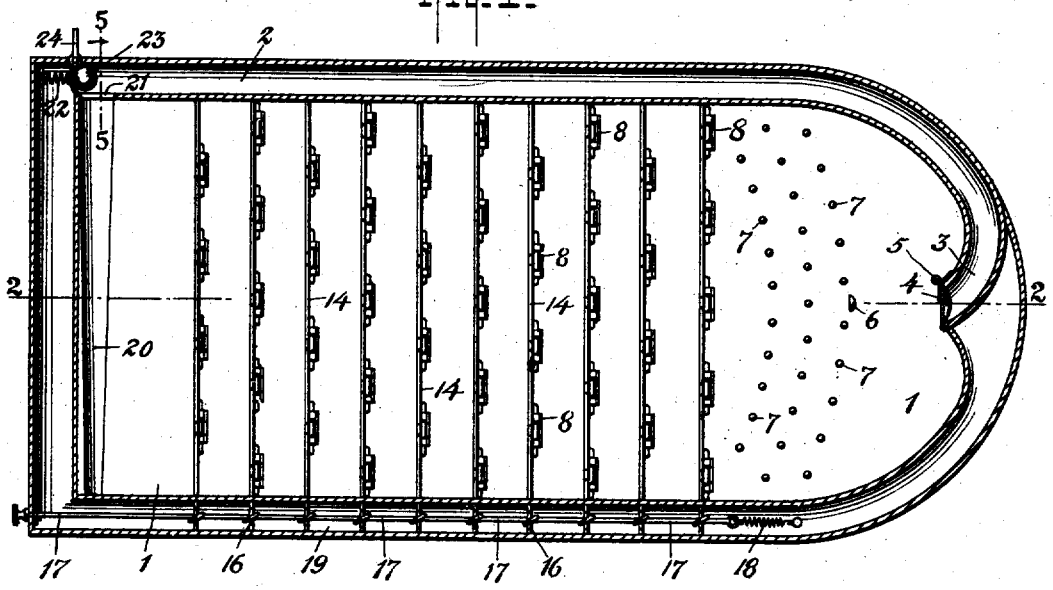
Figure 2:
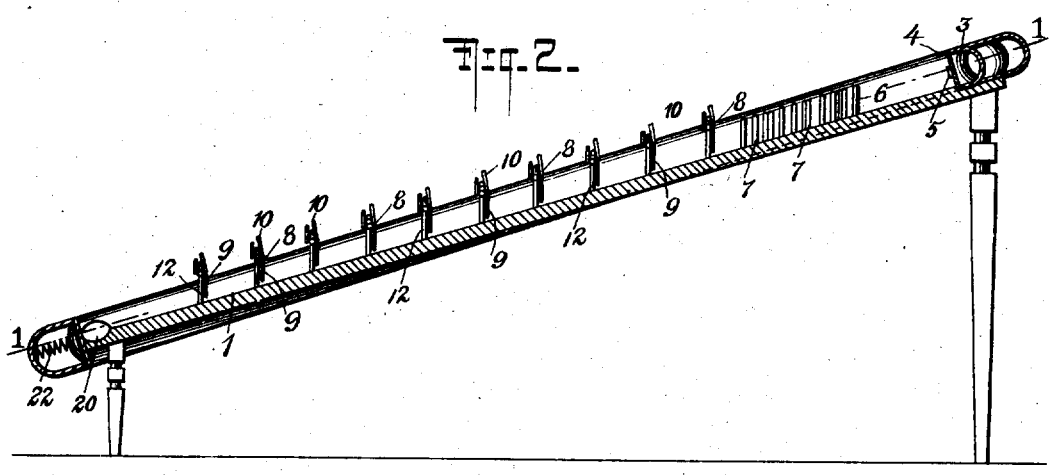
Figure 3:
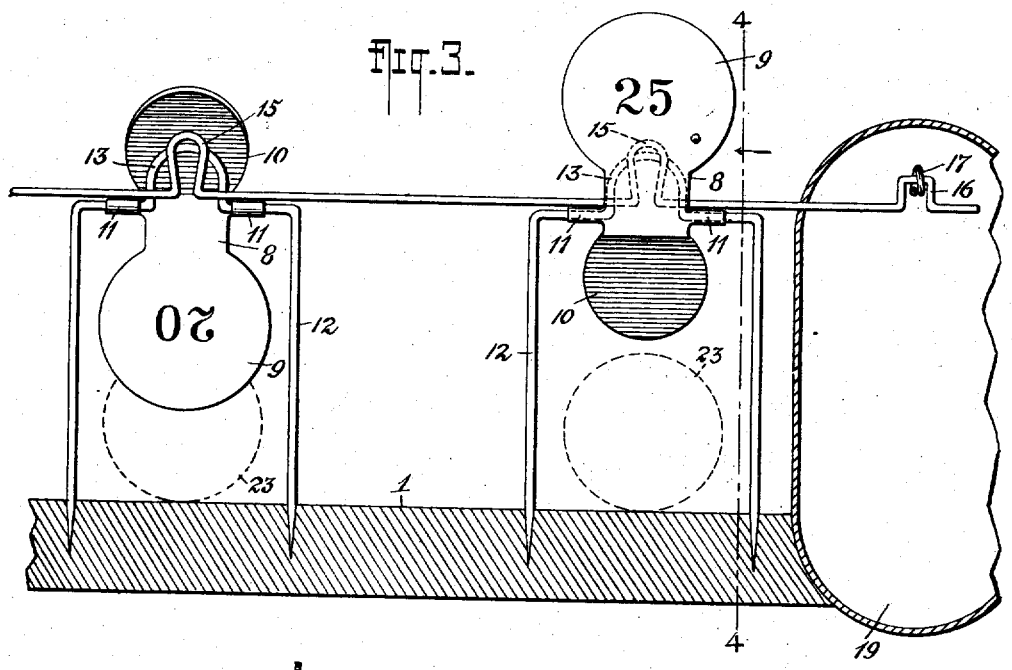
Figure 4:
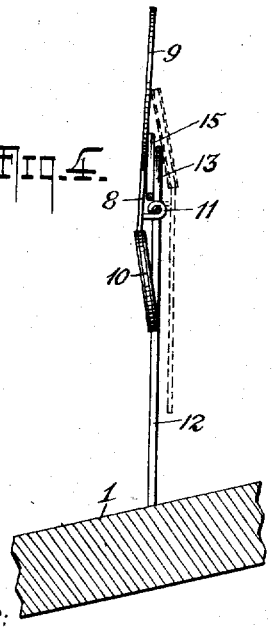
Figure 5:
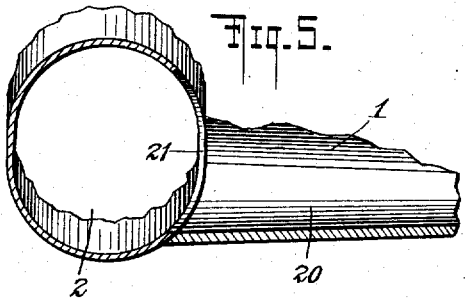

Figure 1 is a plan of a table embodying my invention showing the super-structure thereof in horizontal section taken on the line 1—1 of Fig. 2; Fig. 2 is a vertical longitudinal section taken on the line 2—2 of Fig. 1; Fig. 3 is a side elevation of two adjacent counters and connecting mechanism, with one of the counters elevated as when registering; Fig. 4 is a vertical transverse section taken on the line 4—4 of Fig. 3; and Fig. 5 is a transverse section, taken on line 5—5 of Fig. 1.

As illustrated in the drawings, a table having an inclined bed plate 1 is provided on one side with a longitudinal tubular channel or run-way 2, having a reëntrant upper end 3 opening into the central portion of the upper end of the table, and provided with a trap door 4 which is mounted upon a hinge 5 and arranged in line with a center pin 6 preferably placed slightly in advance of a plurality of pins 7, beyond which are placed a number of counters, 8, as indicated in Fig. 1. The counters 8 are constructed of numbered disks 9 having weighted disks 10 which are preferably inclined slightly relatively to the plane of the numbered disks 9, so as to balance the counters and hold them normally in a vertical position. The counters are provided with sleeves 11 adapted to be pivotally mounted upon standards of any suitable construction, preferably consisting of wickets 12 each having a centrally curved transverse bar 13 which normally bears against the weighted disk 10 and forms a stop therefor. A transverse rod 14 is provided with loops 15 corresponding with the counters, and adapted normally to bear against the looped central portions 13 of the wickets 12 and to bear against the back of the counters when registering, as indicated in Fig. 4 and by dotted lines in Fig. 3. One of the ends of the transverse rods 14 is provided with cranks 16, and the cranks of the several rods are connected together by means of a rod 17, the forward end of which projects beyond the front of the table, as shown in Fig. 1, with its rear end connected with a spring 18 whereby the rods 14 may be rocked in unison so as to turn down the counters when desired. The rod 17 is inclosed within a channel 19 which, together with the channel of the run-way 2 is preferably inclosed so as to make a symmetrical rail extending around the table. An inclined channel 20 extends transversely of the lower portion of the board, and communicates by means of an opening 21, as shown in Fig. 5, with the run-way 2. The end of the channel 20 connected with the run-way 2 is preferably constructed with the bottom portion thereof slightly above the bottom portion of the run-way 2, so as to prevent the ball from rolling out of the run-way and into the channel 20. A lever 24 is pivotally mounted on the side of the table and connected with an actuating spring 22 adapted to shoot a ball 23 along the run-way 2.

In playing the game, the ball 23 is placed in the lower end of the run-way 2, and the spring 22 compressed by means of the lever 24. When pressure is released from the lever the ball 23 is shot along the run-way 2 and passes through the reëntrant portion 3 thereof, and onto the surface of the table. If the trap door 4 is used it is made to swing freely on its hinge so that the force of the ball may readily open the door, which immediately closes by means of a spring attachment of any suitable construction secured thereto, thereby preventing the ball after it strikes the center pins 6 or 7 from rebounding and going back again into the end of the run-way. The ball after passing through the run-way finds its way through one of the several passages between the pins 7, and then passes between the counters 8 or comes in contact therewith. When the ball comes in contact with one of the counters, as shown in Fig. 3, it tilts the counter slightly, and causes the counter-balancing weight 10 to drop, thereby elevating the counting disk, as indicated in Figs. 3 and 4. After the ball has come in contact with and raised one of the counters, it passes downward along the board, raising each of the counters with which it comes in contact. The ball eventually rolls into the channel 20, which being inclined transversely of the board enables the ball to roll back to the position from which it started.

The counters are returned to their original position after each play by means of the reciprocating rod, 17, which is connected to the cranks 16 of the transverse rods 14, and to the spring 18. This rod, when operated, rocks the rods 14 and causes the loops 15 thereon to tilt the counter disks, bringing them back into their original position ready for the next play. The counter disks are marked with appropriate numbers, and the aggregate numbers of the disks swung up with each operation of the ball indicate the score for each play. The game may be played by one or more persons, and any suitable rules adopted therefor.

The embodiment of my invention, as just described, constitutes a form, as at present, preferred. I do not confine myself, however, to the exact details of construction shown, or to the exact relative arrangement of the various component elements and it is obvious that many alterations of detail or disposition of elements may be made without, in any way, departing from the spirit of my invention. Thus, I may or may not stagger the counters or the pins or both, as shown in the drawings; I may or may not use the central pin 6, or the trap-door, 5. Or I may alter the character of the propelling mechanism, 24, or of the counter restoring mechanism 17, 16, 14. None of these changes will affect the essential characteristics of my invention which are clearly, exactly, and fully set forth in the following claims.

By arranging the counterweight 10 at an angle to the plane of the disk 9, I cause said weight to rest forward against the central wicket portion 13 in the normal inactive position of the disk 9 indicated at the left in Fig. 3 and by dotted lines in Fig. 4. The weight thus keeps the disk 9 in its normal lowered position. When the disk is swung by the impact of a ball to the upper position shown at the right in Fig. 3 and by full lines in Fig. 4, the weight 10 keeps the disk 9 in the registering position until the restoring or setting mechanism 14, 16, 17 has been operated.

I claim:

1. In a game apparatus, a wicket provided with a stop, and a counter provided with lateral extensions pivoted on said wicket, said counter comprising a registering portion and an overbalancing counterweight disposed oppositely to said registering portion and adapted to engage the stop of the wicket.

2. In a game apparatus, a wicket provided with a supporting member and a stop projecting therefrom upwardly, and a counter, pivots on said counter, one engaging said supporting member at each side of the stop, said counter comprising a registering portion and an overbalancing counterweight disposed oppositely to said registering portion and adapted to engage the stop of the wicket.

3. In a game apparatus, a wicket provided with a transverse bar the central portion of which is curved upwardly to form a stop, and a counter pivotally mounted on the straight portions of the bar, said counter comprising a registering portion and an overbalancing counterweight disposed oppositely to said registering portion and adapted to engage the stop of the wicket.

4. In a game apparatus, a stationary support provided with a stop, and a counter pivoted on said support, said counter comprising a registering portion and an overbalancing counterweight disposed oppositely to said registering portion and inclined relatively to the plane of the registering portion, said counterweight being adapted to engage the stop and hold the registering portion in either its upper or its lower position.

5. In a game apparatus, a wicket provided with a transverse bar the central portion of which is curved upwardly to form a stop, a counter pivotally mounted on the straight portions of the bar, said counter comprising a registering portion and an overbalancing counterweight disposed oppositely to said registering portion and adapted to engage the stop of the wicket and movable restoring mechanism arranged between the stop and the registering portion when the latter is elevated.

6. In a game apparatus, a wicket provided with a transverse bar the central portion of which is curved upwardly to form a stop, and a counter provided with laterally projecting alining sleeves pivotally mounted on the straight portions of the bar, said counter comprising a registering portion and an overbalancing counterweight disposed oppositely to said registering portion and adapted to engage the stop of the wicket.

7. In a game apparatus, a table provided with a runway extending lengthwise thereof and having its discharge end disposed centrally and extending in the direction opposite to that of the runway's main portion, an automatically closing door at the mouth of said run-way adapted to be opened by pressure from the direction of the run-way and devices mounted on said table and adapted to be struck by balls discharged from said runway.

8. A game apparatus comprising an inclined table, a plurality of wickets provided on their upper ends with vertically extending stops, counters provided with registering portions and counter-balancing weights arranged counter thereto said counters being pivoted on the upper portion of said wickets intermediate of said weights and registering portions, rods extending transversely of said wickets and provided with off-set portions in operative relation to the counters, and a rod reciprocating longitudinally of said apparatus connected with and adapted to rock said transverse rods and arrange the counters in their normal position.

9. In a game apparatus, the combination of a plurality of transverse rows of wickets arranged in staggered relation to each other, and provided on their upper ends with vertically extending stops, pivoted counters provided with laterally extending sleeves journaled on said wickets, and with registering disks, and weights arranged counter to said disks, rods extending transversely of said wickets and provided with off-set portions in operative relation with the counters of each row, and a reciprocating rod extending longitudinally of said apparatus and connected with and adapted to rock said transverse rods and arrange said counters in their normal position.

10. In a game apparatus, the combination of a plurality of transverse rows of wickets arranged in staggered relation to each other, and provided on their upper ends with vertically extending stops, pivoted counters provided with sleeves journaled on said wickets and with registering disks and with inclined counter balancing weights arranged opposite said disks, rods extending transversely of said wickets and provided with off-set portions in operative relation with the counters of each row, and a reciprocating rod extending longitudinally of said apparatus connected with and adapted to rock said transverse rods and arrange the counters in their normal position.

11. A game apparatus comprising an inclined table having a run-way extending lengthwise thereof and provided with a reentrant end arranged centrally of the upper portion of said table, a plurality of pins spaced apart and arranged at the upper end of said table, a central pin arranged opposite to said reëntrant end of the run-way, a plurality of transverse rows of wickets arranged in staggered relation to each other, and a series of counters pivoted intermediate their ends on the upper ends of said wickets and centrally thereof.

12. A game apparatus comprising an inclined table, a plurality of transverse rows of wickets arranged in staggered relation to each other and provided on their upper ends with vertically extending stops, counters provided with registering disks and counter-balancing weights arranged opposite thereto and pivoted intermediate said weights and disks on the upper portion of said wickets, and centrally thereof, rods extending transversely of said wickets and provided with off-set portions in operative relation to the counters of each row, and a rod reciprocating longitudinally of said apparatus connected with and adapted to rock said transverse rods and arrange the counters in their normal position.

13. In a game apparatus, the combination of a row of wickets provided on their upper ends with vertically extending stops, pivoted counters provided with laterally extending sleeves journaled in said wickets and with registering disks and weights arranged counter to said disks, a rod extending transversely of said wickets and provided with off-set portions in operative relation with the counters and a reciprocating rod extending longitudinally of said apparatus and connected with and adapted to rock said transverse rod and arrange said counters in their normal position.

14. In a game apparatus, the combination of a row of wickets provided on their upper ends with vertically extending stops, pivoted counters provided with sleeves journaled on said wickets and with registering disks and with inclined counter balancing weights arranged opposite said disks, a rod extending transversely of said wickets and provided with off-set portions in operative relation with the counters and a reciprocating rod extending longitudinally of said apparatus connected with and adapted to rock said transverse rod and arrange the counters in their normal position.

15. A game apparatus comprising an inclined table having a run-way extending lengthwise thereof and provided with a reentrant end arranged centrally of the upper portion of said table, a plurality of pins spaced apart and arranged at the upper end of said table, a central pin arranged opposite to said reëntrant end of the run-way, a row of wickets, and counters pivoted intermediate of their ends on the upper ends of said wickets and centrally thereof.

In testimony whereof I have hereunto set my hand in the presence of two subscribing witnesses, this 25th day of May, 1908.

JULIUS STERN.

Witnesses:
FRITZ V. FERESLANDER,
JACOB ERENSTOF.